Figure 1:
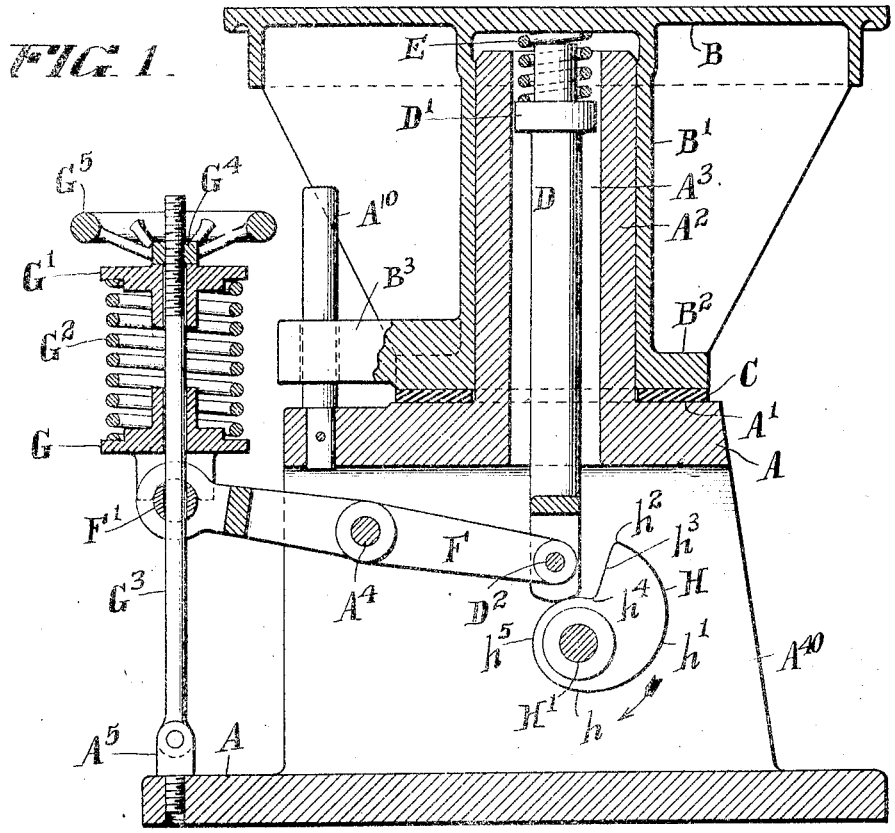

W. LEWIS.
MOLDING MACHINE.
APPLICATION FILED MAR. 15, 1912.

1,113,224.

Patented Oct. 13, 1914.
2 SHEETS—SHEET 1.

WITNESSES

INVENTOR
Wilfred Lewis
BY
ATTORNEY

W. LEWIS.
MOLDING MACHINE.
APPLICATION FILED MAR. 15, 1912.
1,113,224.
Patented Oct. 13, 1914.
2 SHEETS—SHEET 2.
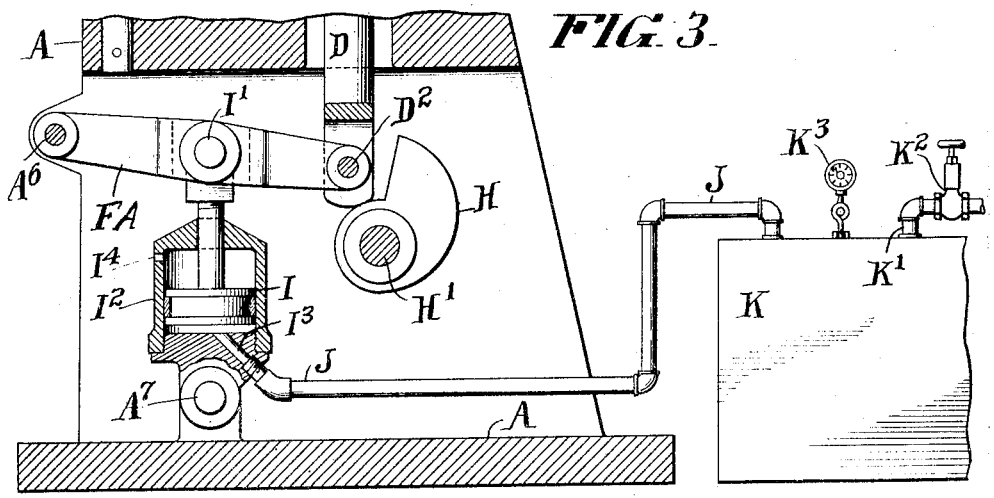
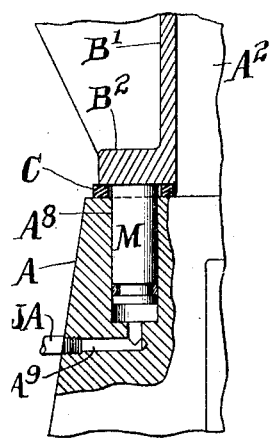
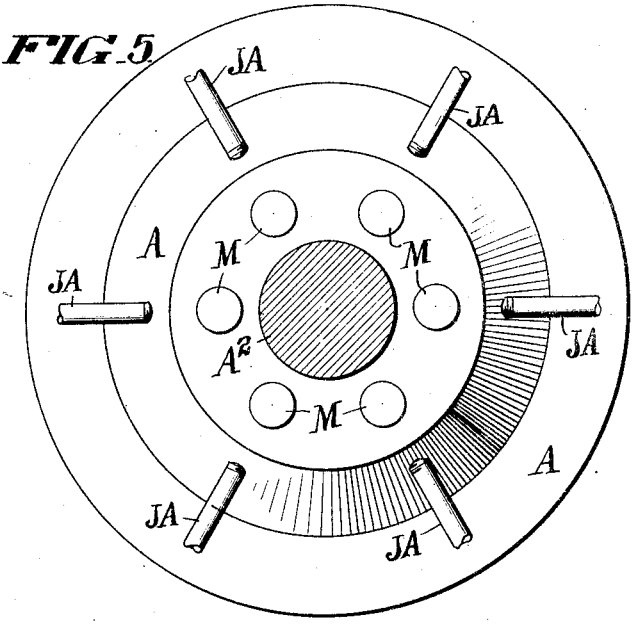
WITNESSES
INVENTOR
Wilfred Lewis
BY
ATTORNEY

UNITED STATES PATENT OFFICE.

WILFRED LEWIS, OF PHILADELPHIA, PENNSYLVANIA, ASSIGNOR TO THE TABOR MANUFACTURING COMPANY, OF PHILADELPHIA, PENNSYLVANIA, A CORPORATION OF PENNSYLVANIA.

MOLDING-MACHINE.

1,113,224.     Specification of Letters Patent.     Patented Oct. 13, 1914.

Application filed March 15, 1912. Serial No. 683,977.

*To all whom it may concern:*

Be it known that I, WILFRED LEWIS, a citizen of the United States of America, residing in the city and county of Philadelphia, in the State of Pennsylvania, have invented a certain new and useful Improvement in Molding-Machines, of which the following is a true and exact description, reference being had to the accompanying drawings, which form a part thereof.

My present invention relates to molding machines of the kind known as jarrers or jar molding machines in which a mold support carrying the flask, pattern or patterns, and sand or other mold forming material, is first lifted above and then allowed to drop back into collision with an anvil, the shock of collision being relied upon to compact the sand or other mold forming material about the patterns. In the operation of a jar molding machine, the compacting of the sand or other mold forming material depends upon the change in velocity of the mold support occurring on impact with the anvil. The sand compacting effect needs to be varied in forming molds differing in character and, also for the best effects in forming some kinds of molds, during different stages in a single mold forming operation.

In molding machines in which compressed air or other pressure fluid is employed to elevate the mold table above the anvil the force of the blows struck may be readily varied by varying the distance through which the mold support falls into collision with the anvil, and a similar regulation has been obtained with molding machines in which the mold table is lifted above the anvil by a cam or analogous mechanical lifting device by adjusting such cam or device to vary the height to which the mold table is lifted preparatory to each drop.

The object of the present invention is to provide simple and effective means for obtaining blows of varying intensity in the operation of a jar molding machine of the kind in which the molding table is lifted a definite and invariable distance above the anvil preparatory to each collision, and for obtaining a desirable reduction in the power required to operate the machine as the intensity of the blows struck decreases. This I accomplish by providing means for impressing a force on the mold support which both assists in the operation of lifting the mold support above the anvil and retards the falling movement of the mold support when this movement is permitted to occur, and which may be readily adjusted to vary the retardation permitted. By varying the lifting force thus impressed upon the mold support the acceleration of the mold support as it falls into collision with the anvil, and the velocity of the mold support at the instant of impact may be varied to make the blow struck at each collision equal in intensity to the blow which would be struck by the mold support if falling freely from a height which is any desired fraction of the actual height to which the mold support is elevated preparatory to each collision.

In the means shown for carrying out my invention I interpose between the mold support and the anvil a resilient cushion and employ in conjunction therewith simple and effective means for varying the force with which this cushion tends to hold the mold support and anvil apart.

An important advantage of my invention consists in the fact that it permits the use of a very simple cam or mechanism for alternately lifting the mold support above and allowing it to fall back into engagement with the anvil while at the same time the desired variations in the sand compacting effect of the collision between the mold support and the anvil are readily obtained.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated several forms in which my invention may be embodied.

Figure 2:
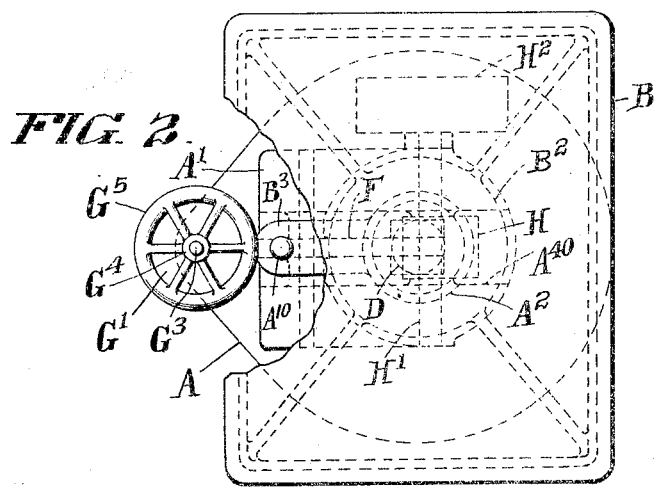

Of the drawings. Figure 1 is a sectional elevation of a molding machine embodying one form of my present invention. Fig. 2 is a plan view of the molding machine shown in Fig. 1. Fig. 3 is a sectional elevation of a modified form of molding machine, and Fig. 4 is a partial sectional elevation and Fig. 5 is a plan view of a third modification of my invention.

In the drawings, and referring first to the construction shown in Figs. 1 and 2, A represents the anvil of the molding machine which may be stationary or may be movable as in the so-called "shockless" jar molding machine described and claimed in my Patent No. 941,999, granted November 30, 1909. As shown the anvil A is provided at its upper end with an impact face A′ surrounding a tubular extension $A^2$ of the anvil. The mold support B is formed with cylindrical portion B′ on its under side which slides on the tubular extension $A^2$. The cylindrical portion B′ is provided with a striking shoulder $B^2$ at its lower end. C represents the usual impact receiving washer interposed between the striking surfaces of the anvil and mold support. $A^{10}$ represents a guide pin secured to the anvil and $B^3$ an apertured extension of the mold support through which the pin $A^{10}$ passes, these parts being employed to prevent the mold support from turning on the anvil extension $A^2$. A rod-like member D working within the tubular anvil extension $A^2$ and formed with an enlargement D′ at its upper end, serves as a seat for a spring E interposed between the member D and the mold support and also as a piston-like guide loosely fitting the bore of the tubular extension $A^2$. At its lower end the member D is pivotally connected as by the pivot pin $D^2$ to a lever F movable within slot $A^{40}$ in the anvil and pivotally connected to the anvil by the pivot pin $A^4$. The outer end of the lever F engages a spring abutment member G which bears against a pin F′ journaled in the lever F. This spring abutment member G and a co-acting spring abutment member G′ are apertured to loosely receive a rod $G^3$. The latter is pivotally connected at its lower end to a bracket member $A^5$ connected to the anvil member. A spring $G^2$ is interposed between the spring abutment members G and G′ and a nut $G^4$ working in the upper threaded end of the rod $G^3$ forms a means by which the tension of the spring $G^2$ may be adjusted. As shown the nut $G^4$ is formed with a hand-wheel $G^5$ by which it may be manually manipulated. The lower end of the member D is adapted to be engaged by a cam H carried by a cam-shaft H′. The latter is journaled in the anvil member and adapted to be coupled to a suitable power device as by means of a belt engaging the pulley $H^2$ carried on one end of the shaft. The pulley $H^2$ may advantageously be made heavy to enable it to exert a fly-wheel effect.

In operation the cam is rotated in the direction indicated by the arrow. While the lifting portion of the cam periphery (arc $h$ $h'$ $h^2$) moves in contact with the lower end of the member D the latter is raised and the mold table is correspondingly lifted above the anvil, and when the movement of the cam in each rotation carries the cam shoulder $h^3$ to the right of the member D, the falling movement of the member D and the mold support begins. The time required for the mold support, when thus disengaged by the cam to move into collision with the anvil, and the velocity of approach of the anvil and mold support at the instant of collision depend in part upon the resistance to the falling movement of the mold support due to the spring $G^2$. The force giving the mold support its downward movement when the cam permits this movement is obviously equal to the difference between the weight of the mold support and its load and the lifting force impressed on the mold support through the lever F, member D and spring E.

By suitably adjusting the tension of the spring $G^2$ the sand compacting effect of the collision of the mold support and anvil may be varied as desired. Moreover, the energy stored up in spring $G^2$ by its compression as the mold support approaches the anvil is paid out during the following movement of the mold support away from the anvil. This results in decreasing the power required to rotate the cam shaft H′ as the force of the blow struck on collision decreases. When the cam shaft H′ is rotated at a constant speed it will be obvious that the angular movement of the cam occurring in the period intervening between the time when the cam shoulder $h^3$ clears the member D and the instant at which impact occurs will be variable and will depend upon the tension of the spring $G^2$. To prevent the falling movement of the mold support from being interrupted by the engagement of the member D with the lifting portion of the cam I form the cam between the cam shoulder $h^3$ and the point $h$ with a surface $h^4$—$h^5$—$h$, which is concentric with the axis of the cam shaft and of such radial distance from the latter that it may be engaged by the member D without holding the impact surfaces of the anvil and mold support apart. With the provision of the circular cam portion $h^4$—$h^5$—$h$ it makes no difference, so far as the operation of the cam is concerned, when impact occurs provided it occurs while the cam is traveling from the position at which the falling movement of the mold support begins into the position in which the lifting portion of the cam periphery engages the lower end of the member D. The surface $h^4$—$h^5$—$h$ may readily be made of sufficient angular extent to permit all desirable variation in the velocity of falling movement of the mold support. The spring E is provided as a cushion device to prevent shock when the cam initially starts to elevate the member D. This spring has no appreciable effect on the velocity of the falling movement of the mold support.

It will be apparent to those skilled in the art that the retarding and power storing and restoring mechanism employed by me may be formed in various ways; for instance, I may employ a fluid pressure cushion for this purpose. One arrangement for accomplishing this is shown in Fig. 3 wherein the machine as a whole is identical with that shown in Figs. 1 and 2, with the exception of the arrangement of the lever FA corresponding to the lever F of the construction first described, and the cushion connection between the lever FA and the anvil member A. In Fig. 3 the lever FA has its end remote from the member D pivotally connected to the anvil A at $A^6$. The stem of a piston I is pivotally connected, as by the pivot pin $I'$ to the lever FA between the ends of the latter. The piston I works in a cylinder $I^2$ which is pivotally connected to the anvil at $A^7$. $I^3$ represents a port opening to the piston chamber in the cylinder member $I^2$ below the piston I, and $I^4$ represents a port connecting the upper end of the piston chamber of the member $I^2$ to the atmosphere. A pipe J connects the port $I^3$ to a source of pressure fluid as for instance a compressed air reservoir K. As shown the latter is adapted to receive compressed air through pipe $K'$ from a pump or other suitable source of supply, not shown. $K^2$ represents a controlling valve in the pipe $K'$ and $K^3$ represents a gage in the pipe for showing the pressure in reservoir K. With this arrangement it will be apparent that the fluid pressure cushion device interposed between the anvil and the lever FA will exercise exactly the same mold support retarding, and energy storing and restoring functions as does the metallic spring cushion device shown in Figs. 1 and 2. If the volume of the reservoir K is very large with respect to the displacement volume of the movable piston $I^2$ the upward pressure exerted by the fluid pressure against the piston $I^2$ will be practically constant regardless of the position of the piston $I^2$. When the ratio between the volume of the reservoir K and the displacement volume of the piston $I^2$ is smaller, however, there will be an appreciable difference between the pressures acting against the underside of the piston $I^2$ when the latter is at the opposite ends of its path of travel. The fluid pressure cushioning device, in this respect, is analogous to the metallic spring cushion of Figs. 1 and 2 wherein the tension of the spring $G^2$ will vary very little or much with the movement of the lever F in accordance with the axial length of the spring member $G^2$ when the latter is uncompressed. The variation in spring tension in any suitably designed device of either type need not be great enough, however, to produce any marked effect and the operator can quite readily compensate for it and obtain blows of the desired intensities.

In Figs. 4 and 5 I have illustrated a third form of my invention in which the cushion mechanism comprises pistons M working in chambers $A^8$ formed in the anvil. The upper end of each piston M bears directly against the striking face $B^2$ of the mold support, and pressure fluid is admitted to the lower ends of the chambers $A^8$ through corresponding ports $A^9$ and pipes JA which may be connected to any suitable source of pressure fluid as for instance such a reservoir as the reservoir K of Fig. 3.

While in accordance with the provisions of the statutes I have illustrated and described the best forms of my invention now known to me it will be apparent to those skilled in the art that changes may be made in the form of the apparatus disclosed without departing from the spirit of my invention, and that under some conditions certain features of my invention may be used with advantage without a corresponding use of other features.

Having now described my invention what I claim as new and desire to secure by Letters Patent is:

1. In a jar molding machine the combination with the mold support and anvil, of a rotary cam journaled in the anvil, a lever pivotally connected to the anvil through which the cam lifts the mold support above the anvil, and means independent of the cam for exerting a lifting force on said lever assisting in the elevation and retarding the falling movements of the mold support, said means being adjustable to vary said force.

2. In a jar molding machine the combination with the mold support and anvil, of a rotary cam journaled in the anvil, a lever pivotally connected to the anvil through which the cam lifts the mold support above the anvil, and an adjustable resilient device connecting said anvil and lever and acting on the latter in a direction to aid in the elevation and to retard the falling movement of the mold support.

3. In a jar molding machine the combination with the mold support and anvil, of a rotary cam journaled in the anvil, a lever pivotally connected to the anvil through which the cam lifts the mold support above the anvil, and an adjustable fluid pressure cushion device pivotally connected to said anvil and to said lever, and acting on the latter in a direction to aid in the elevation of the mold support and to retard the falling movement of the mold support.

4. In a jar molding machine the combination with the mold support and anvil of a rotary cam journaled in the anvil, for lifting said mold support above and allowing it to fall back into engagement with said anvil, and fluid pressure means for exerting a lifting force on said mold support to aid in its elevation, and to retard its falling movement, said means being adjustable to vary said lifting force.

WILFRED LEWIS.

Witnesses:
H. W. BROWN,
R. RAYMOND PORTER.